United States Patent
Maertens (10) Patent No.: US 10,449,494 B2
(45) Date of Patent: Oct. 22, 2019

(54) METHOD FOR DETERMINING THE TRUE AMOUNT OF AN ACTIVE PRODUCT ENTERING A CATALYTIC DEVICE OF AN EXHAUST LINE OF A VEHICLE

(71) Applicants: CONTINENTAL AUTOMOTIVE FRANCE, Toulouse (FR); CONTINENTAL AUTOMOTIVE GmbH, Hannover (DE)

(72) Inventor: Steven Maertens, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 1335 days.

(21) Appl. No.: 14/251,918

(22) Filed: Apr. 14, 2014

(65) Prior Publication Data
US 2014/0308190 A1    Oct. 16, 2014

(30) Foreign Application Priority Data

Apr. 12, 2013 (FR) ..................... 13 53344

(51) Int. Cl.
*B01D 53/94* (2006.01)
*B01D 53/00* (2006.01)

(52) U.S. Cl.
CPC ................. *B01D 53/9495* (2013.01)

(58) Field of Classification Search
CPC .......... F01N 3/208; F01N 9/005; F01N 11/00; F01N 2550/05; F01N 2560/026; F01N 2610/02; F01N 2900/1402

(Continued)

(56) References Cited

U.S. PATENT DOCUMENTS

| 7,707,824 B2 | 5/2010 | Solbrig |
| 2004/0039514 A1 | 2/2004 | Steichen et al. |

(Continued)

FOREIGN PATENT DOCUMENTS

| CN | 1646799 A | 7/2005 |
| CN | 102628390 A | 2/2010 |

(Continued)

OTHER PUBLICATIONS

FR Search Report, dated Jan. 24, 2014, from corresponding FR application.

*Primary Examiner* — Rebecca M Fritchman
(74) *Attorney, Agent, or Firm* — Young & Thompson (57) ABSTRACT

Method for determining a true amount of active product entering a catalytic device of a vehicle exhaust line includes:
  introducing, into the exhaust gas stream upstream of the device, an active flow rate of active product so that the contaminant and active product are absent at the measurement probe at the outlet of the device,
  increasing the active flow rate until the second probe measures a given escape content of the product,
  stabilizing the escape of product, via the measurement provided by the probe, at the given escape content,
  introducing a theoretical additional test flow rate of product into the exhaust gas stream upstream of the device,
  waiting until the total content of product measured in response at the second probe has stabilized, and measuring this stabilized total content, and
  determining the stabilized true additional test flow rate of active product entering the device.

12 Claims, 3 Drawing Sheets

(58) Field of Classification Search
USPC .......................................................... 423/212
See application file for complete search history.

(56) References Cited

U.S. PATENT DOCUMENTS

| | | |
|---|---|---|
| 2005/0282285 A1 | 12/2005 | Radhamohan et al. |
| 2010/0028230 A1 | 2/2010 | Gady et al. |
| 2010/0050611 A1 | 3/2010 | Walz et al. |
| 2010/0122520 A1 | 5/2010 | Han |
| 2011/0138779 A1 | 6/2011 | Neumayer |
| 2011/0203259 A1 | 8/2011 | Upadhyay et al. |
| 2011/0262329 A1* | 10/2011 | Ofoli ............ B01D 53/90 423/213.2 |
| 2012/0073265 A1* | 3/2012 | Yeager ............ F01N 3/106 60/274 |
| 2013/0287657 A1 | 10/2013 | Rodatz et al. |

FOREIGN PATENT DOCUMENTS

| | | |
|---|---|---|
| CN | 101832167 A | 9/2010 |
| CN | 101639005 A | 8/2012 |
| CN | 102946977 A | 2/2013 |
| DE | 102010002620 A1 | 9/2011 |
| DE | 10 2011 008 380 B3 | 1/2012 |
| DE | 102011003670 A1 | 8/2012 |
| EP | 2 080 873 A1 | 7/2009 |

\* cited by examiner

METHOD FOR DETERMINING THE TRUE AMOUNT OF AN ACTIVE PRODUCT ENTERING A CATALYTIC DEVICE OF AN EXHAUST LINE OF A VEHICLE

FIELD OF THE INVENTION

The present invention relates to a method for determining a true amount of an active product entering a catalytic device of an exhaust line of a vehicle, the introduction into the exhaust line of a theoretical amount of said active product or of a product which is a source of said active product being under the orders of a unit for controlling the catalytic device, the latter comprising:
at least one inlet for a mixture comprising the exhaust gases and said active product, and
at least one outlet for the exhaust gases,
said active product acting inside the catalytic device on the exhaust gases for the purpose of reducing or eliminating the content of at least one predetermined contaminant, at the outlet of the catalytic device, the content of said at least one predetermined contaminant being measured in the exhaust gases by means of a measurement probe sensitive to said at least one predetermined contaminant and to said active product and positioned at the outlet of the catalytic device.

BACKGROUND OF THE INVENTION

The exhaust gases from a vehicle comprise certain contaminants which it is necessary to reduce, indeed even eliminate, before discharging the gases to the atmosphere. The standards are increasingly strict and the tolerated content of contaminants in exhaust gases emitted by vehicles is increasingly low. They are in particular nitrogen oxides, generally known under the name $NO_x$, comprising in particular nitrogen oxide NO and nitrogen dioxide $NO_2$. There currently exists, on the exhaust line of some vehicles, a unit known as catalytic converter, the role of which is to reduce the content of $NO_x$ compounds in exhaust gases, indeed even to eliminate all or a portion of these compounds, before the ejection of the exhaust gases into the atmosphere. For this, a catalytic converter used is known under the name of selective catalytic reduction (SCR) device. A reducing agent is generally injected into the exhaust line of the vehicles, upstream of the selective catalytic reduction device, which reducing agent is an active product in the form of gaseous ammonia or a product which is a source of the active product, for example water and urea, for example sold under the name Adblue®, DEF or others, the reaction of which with the exhaust gases triggers, with the evaporation of the water, a thermolysis and a hydrolysis of the urea under certain thermal conditions to form an active product composed of ammonia and isocyanic acid, the latter being obtained if the conversion into ammonia is incomplete. The ammonia and the isocyanic acid, if appropriate, by reaction in the catalytic converter with the exhaust gases and very particularly with the nitrogen oxides which they comprise, form water vapor and molecular nitrogen at the outlet, the isocyanic acid optionally existing at the inlet of the catalytic converter being converted into ammonia and carbon dioxide gas in the catalytic converter by reaction with the water vapor.

The injection of a product which is a source of ammonia, in the example the mixture of water and urea, is carried out by means of a specific injector positioned in the exhaust line sufficiently upstream of the catalytic converter for the ammonia to have the time to be formed on contact with the exhaust gases and to be thoroughly mixed before the source product enters the catalytic converter. A probe at the outlet of the catalytic converter, sensitive to nitrogen oxides, makes it possible to evaluate the effectiveness of the catalytic converter and to adjust the amount of source product injected, via a loop control managed by means of the electronic unit for controlling the catalytic device.

This probe at the outlet of the catalytic converter is also sensitive to the active product and detects the ammonia which might escape from the catalytic converter, an escape which there are generally good reasons to avoid in normal use of the vehicle, and the control unit of the catalytic device normally makes sure that the ammonia content at the outlet of the catalytic converter is reduced to zero. To this end, the selective catalytic reduction device generally has the ability to store a certain amount of buffer ammonia in order to improve its effectiveness at low temperatures, for example less than 200° C. This amount of buffer ammonia is stored by adsorption in the catalytic converter, with a maximum level of storage which falls when the temperature increases and which depends in addition on other conditions, such as the flow rate by volume, the $NH_3$ content in the exhaust gases, and the like. If these conditions change, $NH_3$ can be desorbed and appear at the outlet of the catalyst. The control unit of the selective catalytic reduction device continually manages an appropriate ammonia storage content in the selective catalytic reduction device, determined by a model, and/or an $NO_x$ content at the outlet of the catalytic device which is as low as possible without the presence of ammonia in the exhaust gases. This management is carried out in a loop by means of the data transmitted by the probe at the outlet of the catalytic converter.

It may happen that the injector of the active product or of the product which is a source of the active product drifts in the course of use, leading to the opening time of the injector being increased in order to obtain the same effectiveness in terms of reduction of the $NO_x$ compounds at the outlet of the catalytic device, this with a limit given by a drift which is such that the correction no longer makes it possible to sufficiently reduce the content of $NO_x$ compounds.

The source product is generally composed of 32.5% urea and 67.5% water, which represents the optimum amount of urea for this source product to remain liquid at the lowest temperatures possible. The control unit of the catalytic device is prepared on the basis of a given source product. It may also happen that the percentage of urea present in the source product varies, resulting in additional difficulties in controlling and obtaining a sufficient reduction in the $NO_x$ compounds at the outlet of the catalytic device.

It may also happen that the catalytic converter is of poor quality and/or experiences premature ageing.

The control loop is thus subject to all the sources of drifts of the system (drift of the injector, poor quality of the active product, catalyst and/or sensor failing, and the like) which may impact the conversion of the $NO_x$ compounds. The control loop will, to a certain extent, be able to compensate for these sources of drifts.

OBD (On-Board Diagnostic) legislation requires that this conversion of $NO_x$ compounds be monitored and that a warning be given in the event of dysfunctioning. In the event of dysfunctioning, it is thus currently impossible to determine from where the problem more exactly arises.

SUMMARY OF THE INVENTION

The present invention provides a diagnostic tool in order to direct searches for a dysfunction in the selective catalytic reduction system. More specifically, it consists of a method for determining a true amount of an active product entering a catalytic device of an exhaust line of a vehicle, the introduction into the exhaust line of a theoretical amount of said active product being under the orders of a unit for controlling the catalytic device, the latter comprising:

at least one inlet for a mixture comprising the exhaust gases and said active product, and at least one outlet for the exhaust gases, said active product acting inside the catalytic device on the exhaust gases for the purpose of reducing or eliminating the content or proportion of at least one predetermined contaminant, at the outlet of the catalytic device, the content or the proportion of said at least one predetermined contaminant being measured in the exhaust gases by means of a measurement probe sensitive to said at least one predetermined contaminant and to said active product and positioned at the outlet of the catalytic device, said method being characterized in that it comprises at least the following stages:

introducing, into the exhaust gas stream upstream of the catalytic device, an active flow rate of said active product so that said at least one predetermined contaminant and said active product are absent at said measurement probe at the outlet of the catalytic device, increasing said active flow rate of the active product until said probe measures a given escape content of said active product at the outlet of the catalytic device, corresponding to an escape flow rate of the active product, stabilizing said escape of the active product, via the measurement provided by said probe, at said given escape content, subsequently ordering the introduction of a theoretical additional test flow rate of said active product into the exhaust gas stream upstream of the catalytic device, by means of the unit for controlling the catalytic device, waiting until the total content of the active product measured in response at said probe has stabilized, measuring said stabilized total content of said active product at the outlet of the catalytic device by means of said measurement probe, determining the stabilized true additional test flow rate of said active product entering the catalytic device by subtracting said given escape content of active product from said stabilized total content of the active product and by applying a model for conversion of the content obtained into a flow rate of active product.

The invention thus provides a method for determining the true flow rate of active product entering the catalytic device and thus for checking the decontamination system upstream of the catalytic device, comprising the combination of metering and injecting system and active product or product which is a source of active product, with measurement means located downstream of the catalytic device. The effect of a possible drift of the catalytic device or catalyst is thus uncoupled. The true flow rate of active product entering the catalytic device provides essential information in the decontamination system with catalytic device in order to direct the breakdown searches. With a single probe sensitive both to the active product and to the contaminant(s) which it is desired to reduce, which already exists in the known exhaust systems, the method according to the invention can be employed by means of simple software implemented in the control unit of the catalytic device.

According to an advantageous characteristic, said active product is introduced indirectly via a product which is a source of the active product.

The active product, for example ammonia, is not very practical to use as is in the exhaust line of a vehicle. It is more practical to introduce a source product which is easier to use, from which ammonia will be formed on contact with the exhaust gases.

According to an advantageous characteristic of the above, the method according to the invention additionally comprises a stage which consists in determining said theoretical additional test flow rate of said active product entering said catalytic device starting from an order to introduce a theoretical additional test flow rate of the product which is a source of the active product into the exhaust gas stream upstream of the catalytic device and from a calculation model which converts said theoretical additional test flow rate of the source product into said theoretical additional test flow rate of the active product at the inlet of the catalytic device.

The unit for controlling the catalytic device orders the introduction of a flow rate of source product, the model of the type known to a person skilled in the art making it possible to convert a flow rate of source product into a flow rate of active product at the inlet of the catalytic device using the data on the composition of said source product and the arrangement of the injector of source product with respect to the catalytic device.

According to an advantageous characteristic, said product which is a source of said active product is a mixture of urea and water.

According to an advantageous characteristic, the method according to the invention additionally comprises a stage which consists in comparing said stabilized true additional test flow rate of said active product with said theoretical additional test flow rate of said active product.

This characteristic makes it possible to diagnose if the decontamination system exhibits a problem upstream of the catalytic device. If the measured test flow rate of active product is lower than the ordered theoretical test flow rate of active product, this may mean that the injector comprises a degree of drift and that its true opening time is less than the planned time or that the source product is incorrectly metered as product capable of generating the active product, for example incorrectly metered as urea (according to a lower dosage than the planned dosage). If the measured test flow rate is greater than the theoretical or ordered test flow rate, this may mean that the source product is incorrectly metered as product capable of generating the active product, for example incorrectly metered as urea (according to a greater dosage than the planned dosage), or that the injector exhibits a dysfunction of another order. Such a diagnosis thus makes it possible to direct the search for breakdown and in particular to eliminate with slight means the possibility of a problem possibly originating from the catalytic device or, on the contrary, to focus the search for breakdown on the catalytic device itself if the measured stabilized test flow rate is equal to or substantially equal to the theoretical test flow rate.

According to an advantageous characteristic, said active product is ammonia and said predetermined contaminant is a nitrogen oxide, the catalytic device being a "selective catalytic reduction" device.

According to an advantageous characteristic, said active product is a gaseous substance obtained from a heated solid component.

For example, the ammonia can be stored in the solid state in solid salts which, once heated, release the ammonia in the gaseous state. According to this configuration, it is difficult to determine the amount of ammonia injected into the exhaust gases. The method according to the invention has in this case a favored application.

The present invention relates in addition to a device for determining a true amount of an active product entering a catalytic device of an exhaust line of a vehicle, in response to the introduction into the exhaust line of a theoretical amount of said active product, comprising:
a unit for controlling the catalytic device capable of ordering the introduction into the exhaust line of a theoretical amount of said active product,
a catalytic device comprising:
at least one inlet for a mixture comprising the exhaust gases and said active product, and
at least one outlet for the exhaust gases,
a measurement probe positioned at the outlet of the catalytic device and sensitive to said at least one predetermined contaminant and to said active product,
characterized in that it comprises means for the implementation of each of the stages of a method according to the invention as defined above.

BRIEF DESCRIPTION OF THE DRAWINGS

Other characteristics and advantages will become apparent on the reading which follows of an exemplary embodiment of a method according to the invention, accompanied by the appended drawings, which example is given as nonlimiting illustration.

DETAILED DRAWING OF THE INVENTION

Figure 1:
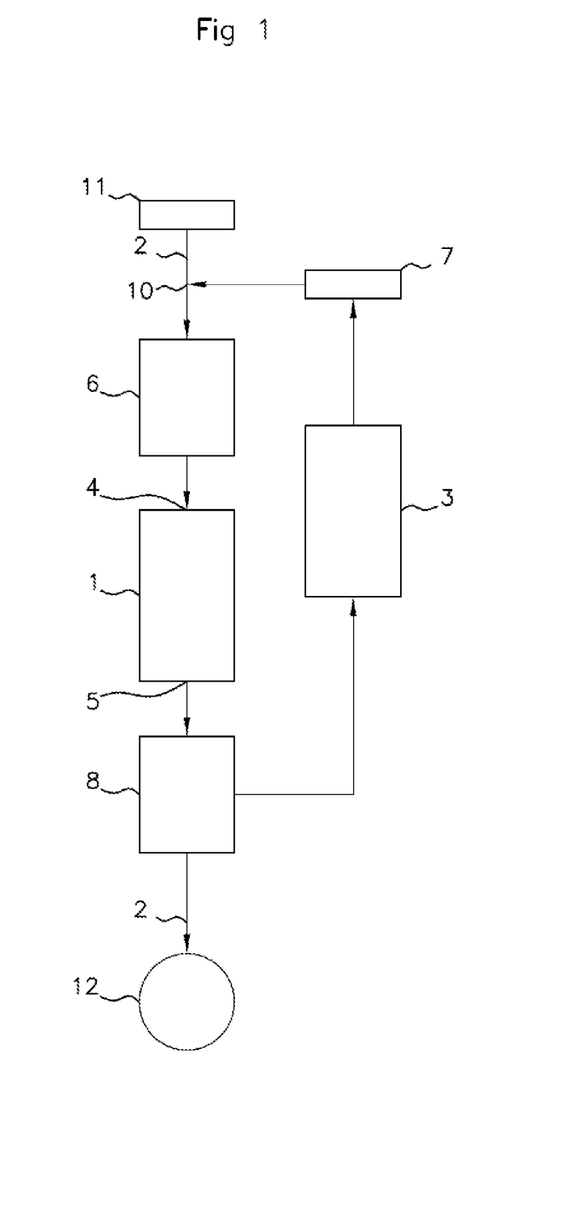
FIG. 1 represents an example of an operating diagram of a vehicle exhaust line according to the prior art.

FIG. 1 represents the operating diagram of an exhaust line 2 of a motor vehicle (not represented), for example. The exhaust gases originate from the exhaust of the internal combustion engine 11. These exhaust gases enter a catalytic device 1, in the example a device of SCR (Selective Catalytic Reduction) type, via an inlet 4 of the latter for the purpose of being decontaminated with regard to content of nitrogen oxide compounds $NO_x$, in particular but not exclusively reduction of nitrogen oxide NO and nitrogen dioxide $NO_2$. The exhaust gases, thus decontaminated, exit via an outlet 5 of the catalytic device 1 in order subsequently to be discharged outside the exhaust line 2 into the atmosphere 12. The exhaust line 2 comprises, in the example, a supply of source product 7, for example a mixture of water and urea comprising 32.5% urea, from which an active product 6, in the example essentially ammonia of formula $NH_3$ and if appropriate isocyanic acid of formula HNCO, will be formed by reaction with the exhaust gases, before entering the catalytic device 1. To this end, in a known way, the source product 7 is introduced into the exhaust line 2 by means of an injector 10 upstream of the inlet 4 of the catalytic device 1, at a sufficient distance from the latter for the ammonia $NH_3$ to be formed at the inlet 4 of the catalytic device 1. When the source product 7 comprising urea of formula $(NH_2)_2CO$ comes into contact with the exhaust gases, the following simplified reaction takes place:

in which the urea is decomposed to give isocyanic acid HNCO and ammonia $NH_3$, also with the following reaction:

in which the isocyanic acid formed is converted, on contact with water, into ammonia and carbon dioxide gas upstream of the catalytic device or, if appropriate, in the latter if the conditions, in particular of temperature, in the exhaust line are not satisfied.

The exhaust line 2 as represented in FIG. 1 comprises a single probe 8 of known type which is sensitive to the $NO_x$ contaminants for which it is desired to reduce the content in the exhaust gases and which is also sensitive to the ammonia active product 6. This single probe 8 is positioned substantially at the outlet 5 of the catalytic device 1, depending on the space physically available for the installation of the probe. A sufficient distance on the exhaust line 2 can in addition be provided between the actual outlet 5 of the catalytic device 1 and the location of the probe 8, allowing the exhaust gas stream to adopt a stabilized flow in order for the probe 8 to carry out a representative measurement of the content of $NO_x$ compounds in the exhaust gases. A control unit 3 for the catalytic device 1 in addition makes it possible, in a known way, using the data transmitted by the probe 8 at the outlet of the catalytic device 1, to order the injection of an appropriate flow rate of source product 7 upstream of the catalytic device 1, as represented in FIG. 1, so that the amount of $NO_x$ contaminants at the outlet 5 of this catalytic device 1 is lowered to an acceptable level, or eliminated, according to the standard in force in the country in which the vehicle is intended to operate. The electronic control unit 3 of the catalytic device 1 thus operates in a closed loop.

Figure 2:
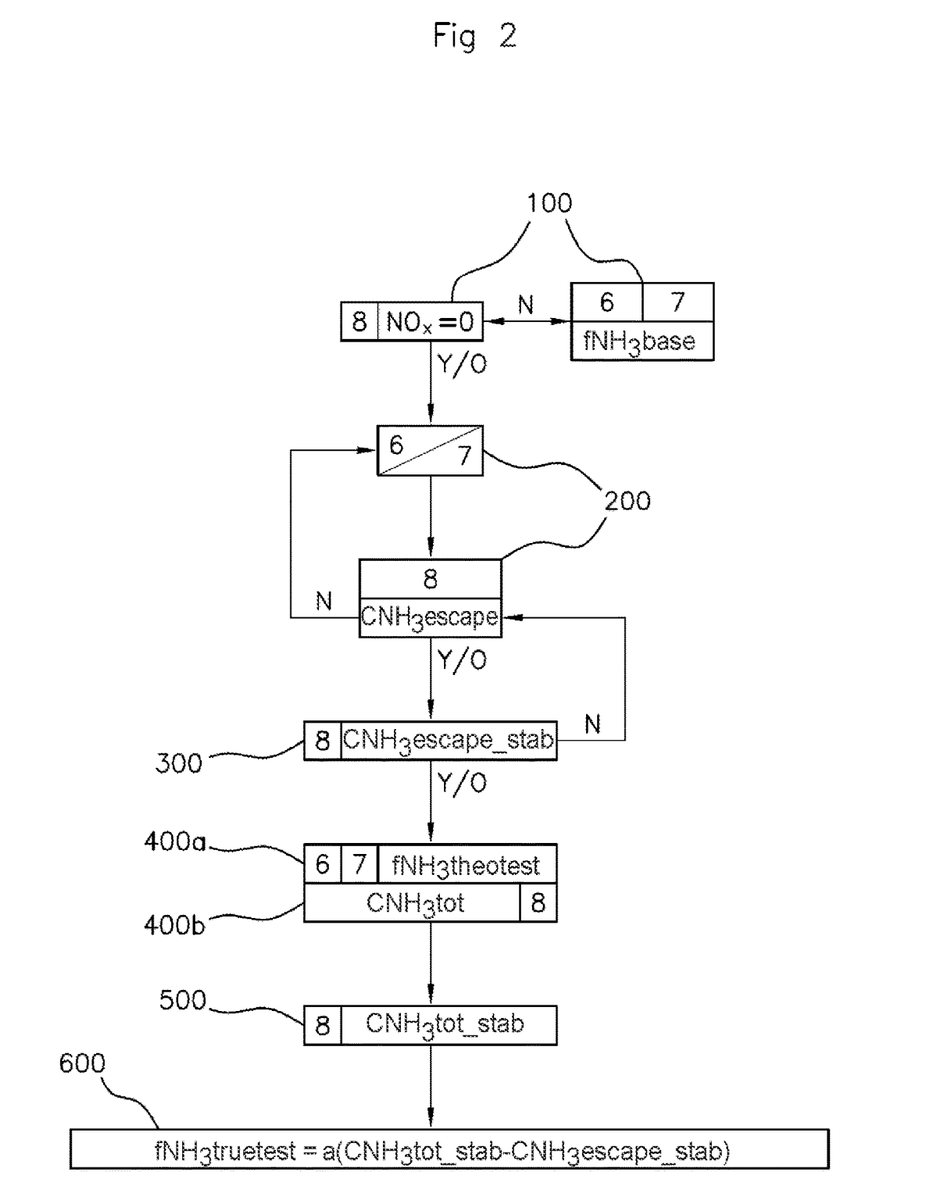
FIG. 2 represents a flow chart of an exemplary embodiment of a method according to the invention for the determination of a true flow rate of an active product entering a catalytic device of an exhaust line of a vehicle.

FIG. 2 represents a flow chart of the example of method according to the invention described as follows, which is supported by an exhaust line, for example a line corresponding to the diagram represented in FIG. 1: the method described makes it possible to determine a true amount of the ammonia $NH_3$ active product 6 entering the catalytic device 1 of the exhaust line 2 of a vehicle in the form of a true flow rate of active product $NH_3$.

The introduction into the exhaust line 2 of a theoretical amount of the product 7 which is a source of the active product 6, in the form of a theoretical flow rate of this source product 7, is ordered by the control unit 3 of the catalytic device 1, the latter comprising at least one inlet 4 for a mixture comprising exhaust gases and the active product 6 and at least one outlet 5 for the exhaust gases, as represented in FIG. 1.

The active product 6 acts inside the catalytic device 1 on the exhaust gases for the purpose of reducing or eliminating the amount of $NO_x$ contaminants at the outlet 5 of the catalytic device 1, according to requirements. The amount of $NO_x$ contaminants is measured in the exhaust gases by means of the measurement probe 8, advantageously sensitive both to the $NO_x$ contaminants and to the active product 6, which is positioned at the outlet 5 of the catalytic device 1. The measurement at the probe 8 is generally carried out to give mixed up contents of contaminant(s) and active product, in ppm (parts per million) by volume.

For the method according to the invention described, there are good grounds for placing the exhaust gas stream under optimal conditions, that is to say temperature conditions under which the degree of oxidation of the ammonia is reduced, indeed even zero, to be defined according to the catalytic converter used, for example temperatures of less than approximately 350° C., and stable or virtually stable flow conditions of the exhaust gases monitored with the probe 8, according to stage 300 below.

The method for determining a true amount of active product 6 entering the catalytic device 1 of the exhaust line 2 of the vehicle, in the form of a true flow rate of active product 6, in response to the introduction into the exhaust line of a theoretical flow rate of active product 6 ordered by a control unit 3 of the catalytic device 1, comprises at least the following stages:

stage 100: introducing, into the exhaust gas stream upstream of the catalytic device 1, an active flow rate $fNH_3base$ of active product 6 so that the $NO_x$ contaminants for which it is desired to reduce or eliminate the content in the exhaust gases, for example the compounds NO and $NO_2$, are absent at the single measurement probe 8 at the outlet of the catalytic device 1, which is sensitive to said $NO_x$ contaminants, and so that the active product 6 is also absent at the single measurement probe 8 at the outlet of the catalytic device 1, which is sensitive to said active product 6; the flow rate $fNH_3base$ is thus an equilibrium which makes it possible to completely reduce the $NO_x$ contaminants at the probe 8 without, however, resulting in an escape of active product $NH_3$ at the probe 8;

stage 200: increasing the active flow rate $fNH_3base$ of active product until the single probe 8 measures a given escape content $CNH_3escape$ of active product 6 at the outlet of the catalytic device 1, corresponding to an escape flow rate $fNH_3escape$ of the active product 6;

stage 300: stabilizing the escape flow rate $fNH_3escape$ of active product 6, via the measurement provided by the single probe 8, at said given stabilized escape content $CNH_3escape$, $CNH_3escape\_stab$;

stage 400a: subsequently ordering the introduction of a theoretical additional test flow rate $fNH_3theotest$ of active product 6 into the exhaust gas stream upstream of the catalytic device 1 by means of the control unit 3 of the catalytic device 1, this test flow rate being added to the flow rate of active product 6 which has given rise to the measured stabilized escape content $CNH_3escape$, $CNH_3escape\_stab$;

stage 400b: waiting until the total content $CNH_3tot$ of active product 6, $CNH_3tot\_stab$, measured in response at the single probe 8 at the outlet of the catalytic device 1 has stabilized;

stage 500: measuring this stabilized total content $CNH_3tot$, $CNH_3tot\_stab$, of active product 6 at the outlet of the catalytic device 1 using the single measurement probe 8;

stage 600: determining the stabilized true additional test flow rate $fNH_3truetest$ of the active product 6 entering the catalytic device 1 by subtracting the given stabilized escape content $CNH_3escape$, $CNH_3escape\_stab$, of active product from the stabilized total content $CNH_3tot$, $CNH_3tot\_stab$, of active product and by applying a model $\alpha$ for conversion of the content obtained into the flow rate of active product; there is thus available:

$$fNH_3truetest = \alpha(CNH_3tot\_stab - CNH_3escape\_stab).$$

The amounts of source product 7 injected into the exhaust line 2 in the form of flow rates are run in a known way by the electronic control unit 3 of the catalytic device 1 and the method described above can be carried out by software implemented in the control unit 3 of the catalytic device.

Figure 3:
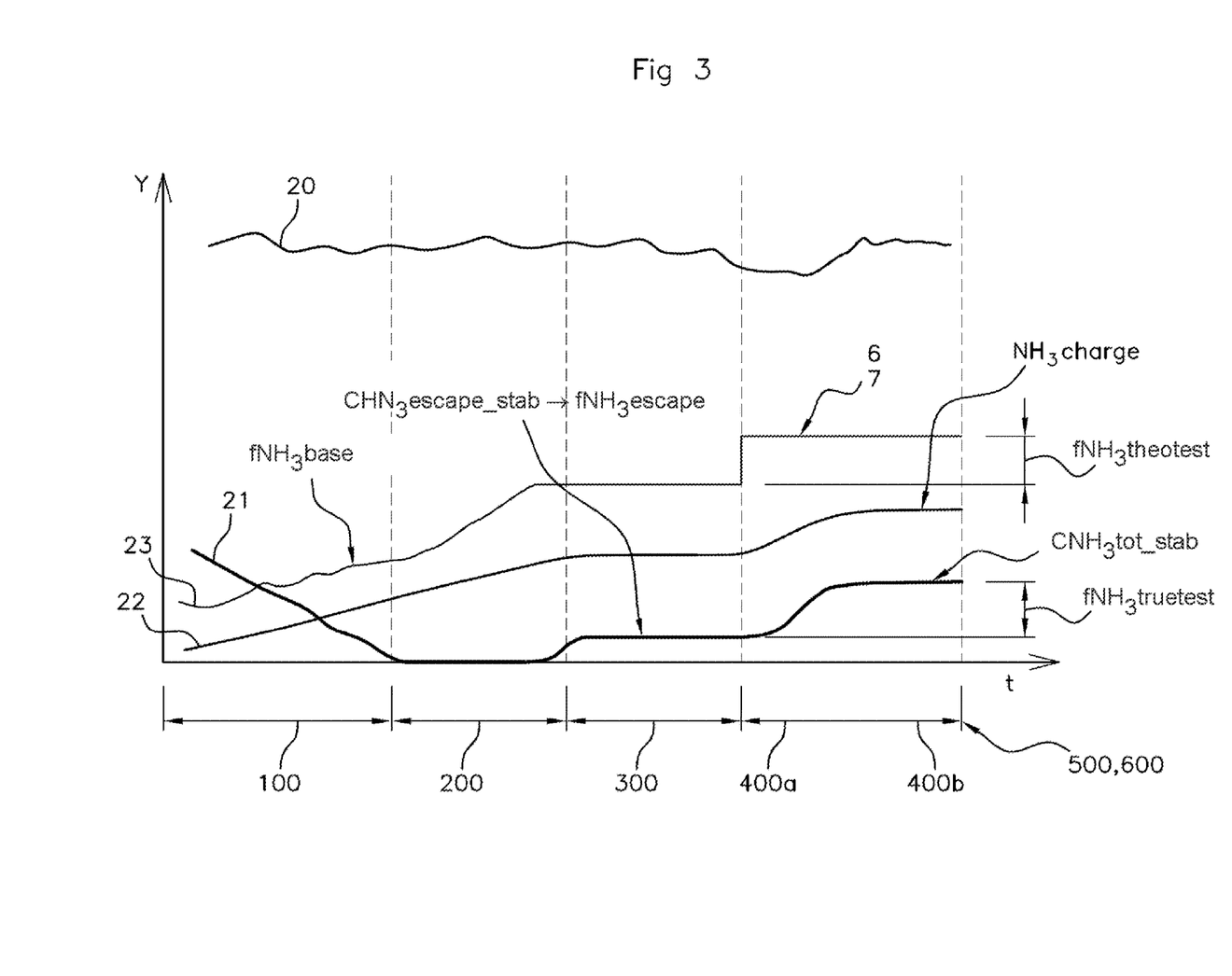
FIG. 3 represents four curves of the change in four parameters in the exhaust line, respectively, relative to the catalytic device, according to the method example of FIG. 2.

In the case of injection of active product 6 via a source product 7, the method described with the help of FIGS. 1 to 3 comprises a stage which consists in determining the theoretical additional test flow rate $fNH_3theotest$ of the active product 6 entering the catalytic device 1 starting from an order to introduce a theoretical additional test flow rate of the product 7 which is a source of the active product 6 and from a conventional model for calculating the incident active product 6 formed at the inlet of the catalytic device 1 which is established in a known way from the composition of the source product used and from the arrangement of the injection of this source product into the exhaust line. For example, it is known that 1 mg of source product of Adblue® type comprises 0.325 mg of urea (on average). It is known that 1 mol of urea theoretically gives 2 mol of $NH_3$. Thus, after conversion with the molar masses, 0.184 mg of $NH_3$ is obtained per 1 mg of product Adblue®.

This model is implemented in the control unit 3 of the catalytic device, which thus gives the theoretical flow rate of active product 6 entering the catalytic device 1, for example the test flow rate $fNH_3theotest$.

Furthermore, the model $\alpha$ for conversion of the content obtained of active product, by difference of the contents measured at the probe 8, into flow rate of active product is also implemented in the control unit 3 of the catalytic device in order for the results of the measurements at the probe 8 to be able to be expressed directly as flow rate, for example as milligrams per second.

Four diagrammatic curves 20, 21, 22 and 23 have been represented in FIG. 3 on a diagram, the axis of the abscissae of which represents the time t and the axis of the ordinates of which represents the measurement Y of the studied parameter of each of the curves 20, 21, 22 and 23, as follows:

the curve 20 represents the content of $NO_x$ contaminants or compounds in the exhaust gases upstream of the catalytic device 1, for example conventionally in ppm (parts per million) by volume; this content of $NO_x$ contaminants is given in a known way either by a model resulting from the combustion or by a probe (not represented) sensitive to the $NO_x$ compounds positioned upstream of the catalytic device 1; the content of $NO_x$ contaminants upstream is represented here simply by way of indication as figurative tendency of this parameter at this point in the exhaust line and is not necessary for the implementation of the method described;

the curve 21 represents the content of $NO_x$ contaminants and of active product 6 mixed up in the exhaust gas downstream of the catalytic device 1, measured by the single probe 8 positioned at the outlet 5 of the catalytic device 1, for example conventionally in ppm (parts per million) by volume; this curve 21 also clearly represents the content of ammonia $NH_3$ present at this point in the exhaust line 2, from the moment when the content of $NO_x$ contaminants is zero, i.e. from stage 200, as this single probe 8 is also sensitive to the active product 6; it should be noted that it has been diagrammatically indicated on this curve 21 where the true flow rate $fNH_3truetest$ is located, originating from the $CNH_3tot$ and $CNH_3escape$ data, as indicated above;

the curve 22 represents the true charge of ammonia $NH_3charge$ stored in the catalytic device 1, illustrating the behavior of the latter, for example in milligrams;

the curve 23 symbolically represents the flow rate of active product 6, which is injected into the exhaust gases via the source product 7 upstream of the catalytic device 1, on order of the control unit 3 of the catalytic device 1, for example in milligrams per second.

The four curves 20, 21, 22 and 23 use the same timescale and are synchronized with respect this timescale. On the axis of the ordinates Y, the scales of magnitude are not, of course, comparable with one another for different parameters and the latter have been represented on the same diagram in order to illustrate the change in the targeted parameters, correlated over time. As regards the curves 20 and 21 representing identical parameters, namely at least in part the content of $NO_x$ contaminants, these curves 20 and 21 have been offset vertically along the Y axis in order to render FIG. 3 clearer in the bottom part; however, these curves 20 and 21 remain comparable in terms of correlated figurative development.

Stages 100, 200, 300, 400a and 400b, 500 and 600 of the method according to FIG. 2, as described above, have been marked out on the timescale t of FIG. 3.

The equation (30) below, which accounts for the variations ($\Delta$) in stream or flow rate ($fNH_3$) of amount of ammonia $NH_3$ between the inlet 4 into the catalytic device 1 and the outlet 5 of the latter and between two given instants on the timescale, can be written in the following way:

$$\Delta fNH_3\text{inlet} = \Delta fNH_3\text{consum} + \Delta fNH_3\text{charge} + \Delta fNH_3\text{outlet} + \Delta fNH_3\text{oxid}, \quad (30)$$

with, all the members $\Delta fNH_3$ of the equation being, for example, in mg/sec:

$\Delta fNH_3$inlet=variation in stream of $NH_3$ entering the catalytic device 1, $\Delta fNH_3$consum=variation in stream of $NH_3$ converted in the catalytic device $\Delta fNH_3$charge=variation in the gradient of the $NH_3$ charge stored in the catalytic device as a function of the time (the gradient of the $NH_3$ charge is the derivative over time of the $NH_3$ charge of the catalytic device 1), $\Delta fNH_3$outlet=variation in stream of $NH_3$ exiting from the catalytic device 1, $\Delta fNH_3$oxid=variation in stream of oxidized $NH_3$.

If the balance is taken of the variations in flow of amounts of ammonia $NH_3$ between the end of the stage 300 and the stage 400b, this equation (30) becomes (for example according to a stable exhaust gas stream at a temperature of the gases of less than 350° C.):

$$\Delta fNH_3\text{inlet} = \Delta fNH_3\text{outlet}.$$

This is because, as represented in FIG. 3, while referring in particular to the curve 21 illustrating the $NO_x/NH_3$ content measured at the probe 8:

in stage 100, the $NO_x$ content at the outlet of the catalytic device 1, measured at the probe 8, is brought to zero;

in stage 200, the $NH_3$ charge held in the catalytic device 1 increases under the effect of an increased injection of product 7 which is a source of active product 6 into the exhaust line, in accordance with the curves 22 and 23, the probe 8 consequently indicating an $NO_x$ and $NH_3$ content maintained equal to zero. When the maximum loading capacity of the catalytic device 1 is reached, an amount of $NH_3$ begins to reach the outlet 5 of the catalytic device and then the probe 8 which indicates this escape of $NH_3$ compound downstream of the catalytic device 1, the $NO_x$ content remaining zero, which substantially reflects the end of stage 200 on the curve 21 of FIG. 3 with an ammonia escape content $CNH_3$escape which takes off;

in stage 300, this escape flow rate of $NH_3$ compound is stabilized; this stabilization is, for example, obtained by making sure that this escape flow rate is stable over a given period of time, for example a few seconds or minutes, by a stable measured content $CNH_3$escape at the probe 8, $CNH_3$escape_stab. It is also noticed, on the curve 22 of FIG. 3, that, during this stage 300, the ammonia charge $NH_3$charge remains constant and thus the gradient of the charge $fNH_3$charge is equal to 0 during this stage 300 and thus also at the end of this stage 300;

in stage 400a, it should be remembered that the introduction is subsequently ordered of a theoretical additional test flow rate $fNH_3$theotest of the active product 6 into the exhaust gas stream upstream of the catalytic device 1, as represented on the curve 23 of FIG. 3, by means of the control unit 3 of the catalytic device; the injection of this additional flow rate (test flow rate) was preferably carried out without modifying the conditions of flow of the exhaust gases. On the other hand, the injection with an additional amount of active product is capable of modifying the conditions of retention of the ammonia inside the catalytic device and thus $NH_3$charge increases during the time of the stabilization;

in stage 400b, after stabilization of the $NH_3$ content measured at the probe 8, thus at the end of stage 400b, the following balance of equation (30), with respect to the end of stage 300, is obtained:

$\Delta fNH_3$consum=0, with an $NO_x$ content at the outlet of the catalytic device 1, measured at the probe 8, brought to zero in stage 100; this is because, the flow conditions of the exhaust gases being stable or virtually stable during the application of the method, there is no creation of additional $NO_x$ during the increase in the flow rate of active product and thus no additional reduction of $NO_x$;

$\Delta fNH_3$charge=0 under stabilized conditions, as the catalytic device 1 has an $NH_3$ charge stabilized in both cases ($fNH_3$charge equal to 0 at the end of stage 300 as in stage 400b);

$\Delta NH_3$oxid=0, as T<350° C. and thus there is no oxidation of the ammonia $NH_3$;

the equation (30) thus gives: $\Delta fNH_3$inlet=$\Delta fNH_3$outlet=$fNH_3$theotest in the case in point. The order for a given theoretical additional test flow rate of source product 7 is thus given by the control unit 3 in stage 400a, as illustrated on the curve 23 of FIG. 3, forming, at the inlet 4 of the catalytic device 1, the corresponding theoretical additional test flow rate of active product 6 $fNH_3$theotest. The theoretical additional test flow rate of source product 7 is, for example, injected by an order to open the injector of source product for a given period of time corresponding to the amount of source product 7 which it is theoretically desired to inject into the exhaust gases in order to carry out the test;

in stage 500, the stabilized total content $CNH_3$tot, $CNH_3$tot_stab, of the active product 6 present in response at the outlet of the catalytic device 1 is thus subsequently measured directly at the probe 8;

in stage 600, as explained above, the stabilized true additional test flow rate $fNH_3$truetest of active product 6 entering the catalytic device 1 is thus obtained.

By way of example, with an additional test flow rate of source product (comprising 32.5% urea) having a value of 1 mg/sec, the urea flow rate is 0.325 mg/sec and $fNH_3$theotest adopts a value of 0.184 mg/sec (see section below), resulting in a $CNH_3$tot at the probe 8 with a value of 11 ppm approximately for an exhaust gas flow of 100 kg/hour and approximately 22 ppm at the probe 8 for an exhaust gas flow of 50 kg/hour, at a temperature of approximately 250° C.

The flow rate fNH₃theotest of the active product 6 will advantageously be compared with the measured flow rate fNH₃truetest during an additional stage as described below. The method described thus in addition preferably comprises a stage which consists in comparing the stabilized true additional test flow rate fNH₃truetest of the active product 6 with the theoretical additional test flow rate fNH₃theotest of the active product 6.

This comparison, which is carried out by means of the control unit 3 of the catalytic device 1, makes it possible to carry out the following diagnosis, of course when the reservoir of source product 7, the injection pump of the latter and the control unit 3 of the catalytic device 1 are operational:

problem originating from the system for injection of the source product or from the composition of this source product, when a difference exists between fNH₃truetest and fNH₃theotest, problem originating from the catalytic device 1 in the absence of difference between fNH₃truetest and fNH₃theotest.

In the first case, the following two subcases can be distinguished:

fNH₃truetest>fNH₃theotest: the injection system injects too much or the source product does not correspond to the model (metering of urea in the water/urea mixture, greater than the model, for example), fNH₃truetest<fNH₃theotest: the injection system does not inject enough, which can have as cause a drift of this injector, or the source product does not correspond to the model (metering of urea in the water/urea mixture, less than the model, for example).

In both the above subcases, the method according to the invention makes it possible to uncouple the system upstream of the injection from the system downstream of the latter and to more accurately diagnose a problem with the injection system or the source product. This accurate diagnosis can thus, for example, prevent a change in catalytic device which is operating correctly.

The difference possibly observed between fNH₃truetest and fNH₃theotest might be used to reset the injected amount of NH₃ (adaptation) in order to check if the system downstream is behaving correctly with a corrected injected amount of NH₃, for example to check if the catalytic device regains a correct effectiveness. If this is not the case, this would indicate that there is also a problem with the downstream system (catalytic device, sensors, mixer, and the like).

Subsequently, this difference possibly found between fNH₃truetest and fNH₃theotest might be used to check the model for calculation of the NH₃ charge of the catalytic device, that is to say to adjust it as a function of the true amount of NH₃ injected, for example by recalculating this model for calculation of the NH₃ charge in the catalytic device between stage 300 and the end of the process described above with the corrected amount of NH₃, in order to check that the calculated charge of NH₃ is stabilized at the end of stage 300 and at the end of stage 400b (like the true charge represented by the curve 22). If this is not the case, this would indicate that there is also a problem with the other inputs of the model (catalytic device, sensors, and the like).

Insofar as a probe which evaluates the quality of the source product is used, it may be possible to uncouple the diagnosis obtained in order to distinguish the origin of the problem between the composition of the source product, on the one hand, and the system for feeding and injection with source product, on the other hand. The probe for quality of the source product makes it possible, in this case, to provide precise data on the quality and the dosage of the source product.

The diagnosis using the method according to the invention would make it possible to avoid the use of such a sensor of quality of source product, which is expensive, insofar as the thermal, hydraulic and electrical diagnoses (which are less expensive) of the injection system are sufficiently accurate.

The example of method according to the invention described above can be carried out by means of software implemented in the control unit of the catalytic device, i.e., for example, the engine control unit (ECU) conventionally equipping a vehicle, for example a motor vehicle.

In the example described, the source product 7 is a mixture of urea and liquid water advantageously comprising an amount of urea of 32.5%, which represents the eutectic dosage for the purpose of maintaining the source product in the liquid state at the lowest possible temperature. The method according to the invention is, however, applicable when the active product is a gaseous substance obtained from a heated solid component directly introduced into the exhaust line.

The invention claimed is:

1. A method for determining a true flow rate of a reducing agent in the form of gaseous ammonia or a product which is a source of gaseous ammonia entering an exhaust stream of an exhaust line in a catalytic device (1) of an internal combustion engine of a vehicle, in response to an introduction into the exhaust line of an ordered additional test flow rate (tNH₃theotest) of said reducing agent ordered by and controlled by an engine control unit (3) for controlling the catalytic device (1), the catalytic device comprising:

at least one inlet (4) for a mixture comprising exhaust gases and said reducing agent, and at least one outlet (5) for the exhaust gases, said reducing agent capable of reacting inside the catalytic device (1) with the exhaust gases with the effect of reducing or eliminating the content of nitrogen oxide in the exhaust gasses and originating from combustion in the internal combustion engine, at the outlet (5) of the catalytic device (1), the content of said nitrogen oxide being measured in the exhaust gases by means of a measurement probe (8) sensitive to said nitrogen oxide and to said reducing agent and positioned at the outlet of the catalytic device (1), wherein measurement by the probe when both the nitrogen oxide and the reducing agent are present results in a measurement of mixed up content of both the nitrogen oxide and the reducing agent in a manner that does not distinguish the relative amounts of the nitrogen oxide and the reducing agent said method being characterized in that it comprises at least the following steps employed by software implemented by the engine control unit:

(100) introducing, into the exhaust gas stream upstream of the catalytic device (1), an active flow rate (fNH₃base) of said active reducing agent, and measuring the content of said nitrogen oxide and said reducing agent using the measurement probe (8), wherein the introduction of the active flow rate (fNIbbase) of said reducing agent is at a rate such that said nitrogen oxide and said reducing agent are absent at said measurement probe (8) at the outlet of the catalytic device (1), (200) increasing said active flow rate (fNH$_3$base) of the reducing agent, and measuring the content of said reducing agent using the measurement probe (8), wherein the increasing proceeds until said probe (8) measures a given escape content (CNH$_3$escape) of said reducing agent at the outlet of the catalytic device (1), said given escape content of said reducing agent corresponding to an escape flow rate (fNH$_3$escape) of the reducing agent, (300) measuring continuously using the measurement probe (8) and stabilizing said escape content (CNH$_3$escape) of the reducing agent, via the measurement provided by said probe (8) to be stable over a given period of time, at said stable given escape content (CNH$_3$escape stab), (400*a*) subsequently ordering the introduction of an ordered additional test flow rate (fNH$_3$theotest) of said reducing agent into the exhaust gas stream upstream of the catalytic device (1), (400*b*) continuously measuring using the measurement probe (8) until a total content of the reducing agent measured at said probe (8) has stabilized, (500) measuring said stabilized total content (CNH$_3$tot stab) of said reducing agent at the outlet of the catalytic device (1) by means of said measurement probe (8), (600) determining a stabilized true additional test flow rate (fNH$_3$truetest) of said reducing agent entering the catalytic device (1) by subtracting said given stabilized escape content (CNH$_3$escape stab) of reducing agent from said stabilized total content (CNH$_3$tot stab) of the reducing agent and by applying a model for conversion of the content obtained from said subtraction into the true flow rate of the reducing agent; wherein the model is implemented in the engine control unit.

2. The method as claimed in claim 1, in which said reducing agent is introduced indirectly via a source product (7) of the reducing agent.

3. The method as claimed in claim 2, additionally comprising a step of determining said ordered additional test flow rate (fNH$_3$theotest) of said reducing agent entering said catalytic device (1) starting from the ordering of the introduction of a ordered additional test flow rate of the product (7) which is a source of the reducing agent into the exhaust gas stream upstream of the catalytic device and from a calculation model which converts said ordered additional test flow rate of the source product (7) into said ordered additional test flow rate (fNH$_3$theotest) of the reducing agent at the inlet of the catalytic device.

4. The method as claimed in claim 2, in which said source product which is a source of said reducing agent is a mixture of urea and water.

5. The method as claimed in claim 1, additionally comprising a step of comparing said stabilized true additional test flow rate (fNH$_3$truetest) of said reducing agent with said ordered additional test flow rate (fNH$_3$theotest) of said reducing agent.

6. The method as claimed in claim 1, wherein the catalytic device (1) is a selective catalytic reduction device.

7. The method as claimed in claim 1, in which said reducing agent is a gaseous substance obtained from a heated solid component.

8. The method as claimed in claim 2 in which said product (7) which is a source of said reducing agent is a mixture of urea and water.

9. The method as claimed in claim 3 in which said product (7) which is a source of said reducing agent is a mixture of urea and water.

10. The method as claimed in claim 2 additionally comprising a step of comparing said stabilized true additional test flow rate (fNH$_3$truetest) of said reducing agent with said ordered additional test flow rate (fNH$_3$theotest) of said reducing agent active product (6).

11. The method as claimed in claim 3 additionally comprising a step of comparing said stabilized true additional test flow rate (fNH$_3$truetest) of said reducing agent with said ordered additional test flow rate (fNH$_3$theotest) of said reducing agent.

12. The method as claimed in claim 4 additionally comprising a step of comparing said stabilized true additional test flow rate (fNH$_3$truetest) of said reducing agent with said ordered additional test flow rate (fNH$_3$theotest) of said reducing agent.

* * * * *